US 6,689,863 B1

(12) United States Patent
Srinivasan et al.

(10) Patent No.: US 6,689,863 B1
(45) Date of Patent: Feb. 10, 2004

(54) POLYCARBONATE COPOLYMERS AND METHODS FOR PRODUCING THE POLYCARBONATE COPOLYMERS

(75) Inventors: Veeraraghavan Srinivasan, Bangalore (IN); Rein Mollerus Faber, Bergen op Zoom (NL); Prakash P. Wadgaonkar, Maharashtra (IN); Chilukuri Ver Avadhani, Maharashtra (IN); Jan Pleun Lens, Breda (NL); Gautam Chatterjee, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/065,358

(22) Filed: Oct. 8, 2002

(51) Int. Cl.[7] ................................................ C08G 64/00

(52) U.S. Cl. ...................... 528/198; 524/157; 524/611; 528/196; 528/204

(58) Field of Search .................................. 528/196, 198, 528/204; 524/157, 611

(56) References Cited

U.S. PATENT DOCUMENTS

| 4,180,651 A | * | 12/1979 | Mark ........................ 528/202 |
| 4,217,438 A | | 8/1980 | Brunelle et al. ............. 528/202 |
| 4,638,027 A | * | 1/1987 | Mark et al. ................. 524/157 |
| 5,010,162 A | | 4/1991 | Serini et al. ................ 528/196 |
| 5,010,163 A | | 4/1991 | Serini et al. ................ 528/196 |
| 5,021,542 A | | 6/1991 | Serini et al. ................ 528/204 |
| 6,255,439 B1 | | 7/2001 | Avadhani et al. ........... 528/196 |

* cited by examiner

Primary Examiner—Terressa M. Boykin

(57) ABSTRACT

A polycarbonate copolymer comprising structural units derived from a cyclohexylidene bis(alkylphenol) of the formula:

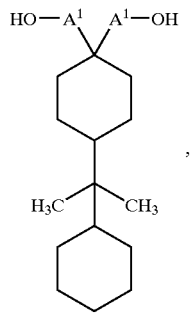

wherein $A^1$ is a trisubstituted aromatic radical having the formula $C_6H_3R^2$, wherein $R^2$ is selected from the group consisting of $C_1$–$C_6$ alkyl radicals, and combinations comprising at least one of the foregoing radicals; a long chain alkyl-substituted bisphenol of the formula

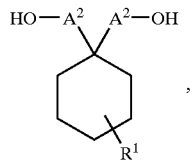

wherein $A^2$ is a substituted or unsubstituted aromatic radical; and $R^1$ is selected from the group consisting of $C_{13}$–$C_{22}$ alkyl radicals; a carbonic acid diester; and optionally at least one aromatic dihydroxy compound of the formula:

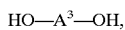

wherein $A^3$ is selected from divalent substituted and unsubstituted aromatic radicals.

23 Claims, No Drawings

POLYCARBONATE COPOLYMERS AND METHODS FOR PRODUCING THE POLYCARBONATE COPOLYMERS

BACKGROUND

The disclosure relates to generally to polycarbonates and methods for producing the polycarbonates, and more particularly, to polycarbonate copolymers, methods for producing the polycarbonate copolymers, and articles thereof.

Polycarbonate homopolymers are widely used in a variety of applications by virtue of their excellent physical properties, such as impact resistance, mechanical characteristics, transparency, and the like. Bisphenol A (BPA) polycarbonate, the industry benchmark material, by virtue of its low cost, good transparency, and mechanical properties, has served as the substrate of choice for optical data storage media, such as, for example, compact disks and digital versatile disks (DVD). However, the need to store greater amounts of information on individual disks has resulted in newer techniques for high-density data storage based on multiple information layers and shorter wavelength lasers. Exemplary high-density storage disks include high density DVD (HDDVD), digital video recordable (DVR), DVD-recordable (DVD−R and DVD+R), and DVD-rewritable (DVD−RW and DVD+RW) formats. The high-density storage disks include a transparent plastic layer that forms a non-interfering shielding layer. The transparent plastic layer preferably exhibits high transparency, heat resistance, low water absorption, and ductility, specifications that standard BPA homopolycarbonates fail to meet.

One property that influences the efficacy of a given material for higher data storage density is the spacing between the pits and grooves on the substrate material. Since data is stored in these pits and grooves, the flatness of the disk is necessary to prevent loss of information. It is known that excessive moisture absorption by the disk can result in skewing (also referred to as warpage) of the disk or the films that form the disk, which in turn leads to reduced reliability for reading and writing data. This skewing, hereinafter referred to as dimensional stability, will result in data being stored or read inaccurately by the laser beam. Since the bulk of the disk is generally comprised of polymer material, the flatness of the disk depends on the low water absorption of the polymeric material. For example, a film produced from conventional BPA polycarbonate often exhibits warpage due to absorption of ambient moisture. The dimensional stability is a function of, among other factors, the amount of ambient moisture present as well as the rate of moisture absorption. In addition to possessing dimensional stability, a satisfactory material for such advanced format optical disks should also be capable of replication and cycle time vis-à-vis the conditions employed for manufacturing conventional optical disks, such as compact disks. In order to produce disks suitable for high-density storage through injection molding, the polymer should also be easily processible, that is, exhibit good flow. Therefore, there is a continued need for developing new materials suitable for use in advanced data storage formats that provide effective dimensional stability, replication and cycle times, without compromising on any of the other desirable characteristics that BPA homopolycarbonate already possesses.

BRIEF SUMMARY

Disclosed herein is a polycarbonate copolymer comprising structural units derived from: a cyclohexylidene bis (alkylphenol) compound represented by a formula comprising:

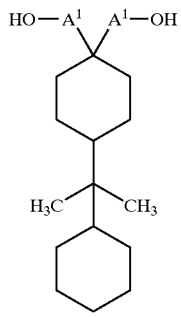

wherein $A^1$ is a trisubstituted aromatic radical having the formula $C_6H_3R^2$, wherein $R^2$ is selected from the group consisting of $C_1$–$C_6$ alkyl radicals, and combinations comprising at least one of the foregoing radicals; an alkyl-substituted bisphenol represented by a formula comprising:

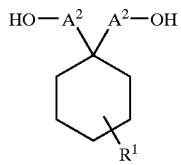

wherein $A^2$ is a substituted or unsubstituted aromatic radical; and $R^1$ is selected from the group consisting of $C_{13}$–$C_{22}$ alkyl radicals; and a carbonic acid diester compound.

A melt transesterification polymerization method for producing a polycarbonate comprises combining a catalyst and a reactant composition to form a reaction mixture; and mixing the reaction mixture under reactive conditions for a time period to produce a polycarbonate product, wherein the reactant composition comprises: a carbonic acid diester of the formula $(ZO)_2C=O$, where each Z is independently an unsubstituted or substituted alkyl radical, or an unsubstituted or substituted aryl radical; a cyclohexylidene bis (alkylphenol) of the formula:

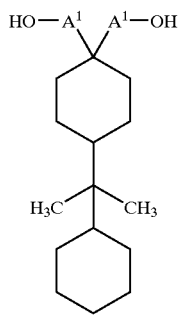

wherein $A^1$ is a trisubstituted aromatic radical having the formula C6H3R2, wherein $R^2$ is selected from the group consisting of $C_1$–$C_6$ alkyl radicals, and combinations comprising at least one of the foregoing radicals; and an alkyl-substituted bisphenol of the formula:

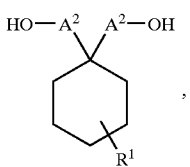

wherein $A^2$ is a substituted or unsubstituted aromatic radical; and $R^1$ is selected from the group consisting of $C_{13}$–$C_{22}$ alkyl radicals;

In another embodiment of the disclosure, a melt transesterification polymerization method for producing a polycarbonate copolymer comprises combining a catalyst comprising at least one of sodium hydroxide or tetramethylammonium hydroxide, and a reactant composition to form a reaction mixture; and mixing the reaction mixture under reactive conditions for a time period to produce a polycarbonate product, wherein the reactant composition comprises: diphenyl carbonate, a cyclohexylidene bis(alkylphenol) of the formula:

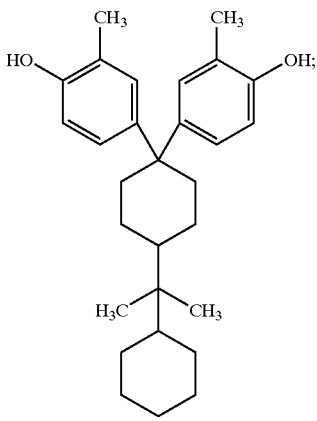

a long chain alkyl-substituted bisphenol of the formula:

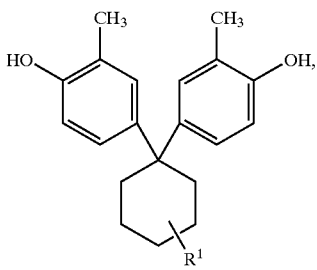

wherein $R^1$ independently comprises a $C_{13}$–$C_{22}$ long chain alkyl radical; and at least one aromatic dihydroxy compound comonomer selected from the group consisting of resorcinol, bisphenol A, 4,4'-(1-decylidene)-bisphenol, 2,2-bis(3-sec-butyl-4-hydroxyphenyl)propane, and mixtures thereof.

The above-described embodiments and other features will become better understood from the detailed description that follows.

DETAILED DESCRIPTION

Disclosed herein are polycarbonate copolymers suitable for use in optical disks employing high-density data storage formats. The polycarbonate copolymers are preferably formed by a melt transesterification process (i.e., a melt method) of a reaction mixture comprising a cyclohexylidene bis(alkylphenol), an alkyl-substituted bisphenol, and a carbonic acid diester compound. An optional aromatic dihydroxy compound comonomer may also be included in the reaction mixture depending on the desired properties of the polycarbonate copolymer. The alkyl-substituted bisphenol preferably contains a long chain alkyl group, i.e., an alkyl group of about $C_{13}$ to about $C_{22}$, which provides the polycarbonate copolymer with a balanced blend of ductility, flow, and thermal properties.

The cyclohexylidene bis(alkylphenol) preferably comprises compounds represented by formula (I):

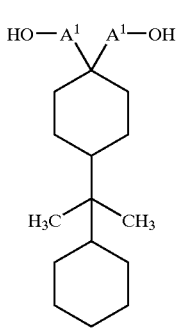

(I), wherein $A^1$ is a trisubstituted aromatic radical. In a preferred embodiment, $A^1$ has a formula comprising $C_6H_3R^2$, wherein $R^2$ is selected from the group consisting of $C_1$–$C_6$ alkyl radicals, and combinations comprising at least one of the foregoing radicals. Further, the alkyl radicals can be linear or branched. In other embodiments, $R_2$ can also be a cycloalkyl group, such as cyclohexyl; and a halogen atom, such as fluorine, chlorine, and bromine. In a preferred embodiment, the cyclohexylidene bis (alkylphenol) has the formula (II):

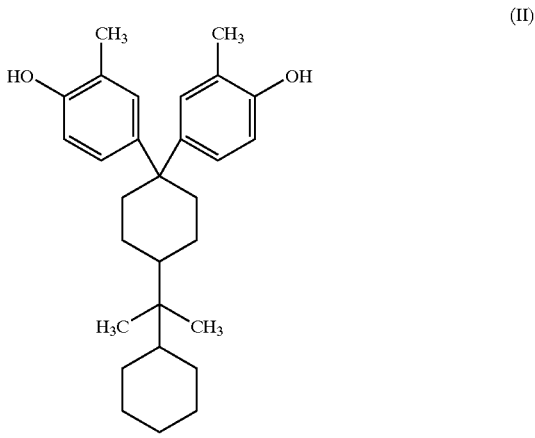

(II)

The alkyl-substituted bisphenols are preferably represented by formula (III):

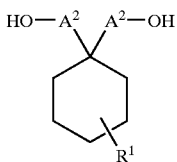

(III), wherein $A^2$ is a substituted or unsubstituted aromatic radical; and $R^1$ is a saturated aliphatic radical having from about 13 carbons to about 22 carbons. The $R^1$ can in principle occupy any of the five positions available on the cyclohexane ring. In preferred embodiments, $A^2$ is an unsubstituted phenylene radical, or a methyl-substituted phenylene radical; and $R^1$ is a saturated aliphatic radical bonded to C-3 or the C-4 atom (relative to the carbon bonded to the two $A^2$—OH groups) of the cyclohexane ring, and having from about 13 carbons to about 22 carbons. In some embodiments, the alkyl substituted bisphenol is selected from the group consisting of 1,1-bis(3-methyl-4-hydroxyphenyl)-3-pentadecylcyclohexane; 1,1-bis(3-methyl-4-hydroxyphenyl)-3-octadecylcyclohexane, and 1,1-bis(3-methyl-4-hydroxyphenyl)-3-docosylcyclohexane.

The carbonic acid diester is preferably represented by formula (IV):

$$(ZO)_2C=O, \qquad (IV)$$

wherein each Z is independently an unsubstituted or substituted alkyl radical, or an unsubstituted or substituted aryl radical. Substituents on Z, when present, may include, but are not limited to, one or more of alkyl, halogen, chloro, bromo, fluoro, nitro, alkoxy, alkoxycarbonyl, methoxycarbonyl, ethoxycarbonyl, and cyano. Some particular examples of the carbonic acid diester that can be used in the present disclosure include diaryl carbonates, dialkyl carbonates and mixed aryl-alkyl carbonates such as diphenyl carbonate, bis(2,4-dichlorophenyl) carbonate, bis(2,4,5-trichlorophenyl) carbonate, bis(2-cyanophenyl) carbonate, bis(o-nitrophenyl) carbonate, (o-carbomethoxyphenyl) carbonate; (o-carboethoxyphenyl)carbonate, ditolyl carbonate, m-cresyl carbonate, dinaphthyl carbonate, di(biphenyl) carbonate, diethyl carbonate, dimethyl carbonate, dibutyl carbonate and dicyclohexyl carbonate, and combinations of two or more thereof. Of these, diphenyl carbonate is often used in particular embodiments. In some embodiments, if two or more of these compounds are utilized, one is diphenyl carbonate.

The optional aromatic dihydroxy compound comonomers is preferably represented by formula (V):

wherein $A^3$ is selected from divalent substituted or unsubstituted aromatic radicals.

In some embodiments, $A^3$ preferably has a structure represented by formula (VI):

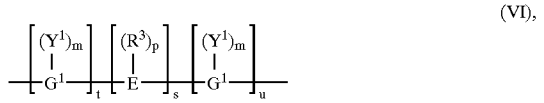

wherein $G^1$ represents an aromatic group, such as phenylene, biphenylene, naphthylene, and the like. E may be an alkylene or an alkylidene group such as methylene, ethylene, ethylidene, propylene, propylidene, isopropylidene, butylene, butylidene, isobutylidene, amylene, amylidene, isoamylidene, and the like, and may consist of two or more alkylene or alkylidene groups connected by a moiety different from alkylene or alkylidene, such as an aromatic linkage, a tertiary amino linkage, an ether linkage, a carbonyl linkage, a silicon-containing linkage such as silane or siloxy, or a sulfur-containing linkage such as sulfide, sulfoxide, sulfone, and the like, or a phosphorus-containing linkage such as phosphinyl, phosphonyl, and the like. In addition, E may comprise a cycloaliphatic group. $R^3$ preferably represents hydrogen or a monovalent hydrocarbon group such as alkyl, aryl, aralkyl, alkaryl, or cycloalkyl. $Y^1$ preferably comprises a halogen (e.g., fluorine, bromine, chlorine, or iodine), a nitro group, an organic group such as alkenyl, allyl, or $R^3$ above, or an oxy group such as OR. Preferably, $Y^1$ is inert to and unaffected by the reactants and reaction conditions used to prepare the copolymer. The letter "m" represents any integer from and including zero through the number of positions on $G^1$ available for substitution; "p" represents an integer from and including zero through the number of positions on E available for substitution; "t" represents an integer equal to at least one; "s" is either zero or one; and "u" represents any integer including zero.

Suitable examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like; a sulfur-containing linkage, such as sulfide, sulfoxide or sulfone; a phosphorus-containing linkage, such as phosphinyl, phosphonyl; an ether linkage; a carbonyl group; a tertiary amino group; or a silicon-containing linkage such as silane or siloxy.

In the aromatic dihydroxy comonomer compound of formula (V) in which $A^3$ is represented by formula (VI), when more than one $Y^1$ substituent is present, they may be the same or different. The same holds true for the $R^1$ substituent. Where "s" is zero in formula (VI) and "u" is not zero, the aromatic rings are directly joined with no intervening alkylidene bridging group or other bridge. The positions of the hydroxyl groups and $Y^1$ on the aromatic nuclear residues ($G^1$) can be varied in the ortho, meta, or para positions and the groupings can be in vicinal, asymmetrical or symmetrical relationship, wherein two or more ring carbon atoms of the hydrocarbon residue are substituted with $Y^1$ and hydroxyl groups. In some particular embodiments, the parameters "t", "s", and "u" are each one; both $G^1$ radicals are unsubstituted phenylene radicals; and E is an alkylidene group such as isopropylidene. In particular embodiments, both $G^1$ radicals are para-phenylene, although both may be ortho- or meta-phenylene or one ortho- or meta-phenylene and the other para-phenylene.

Some illustrative, non-limiting examples of aromatic dihydroxy comonomer compounds of formula (V) include the dihydroxy-substituted aromatic hydrocarbons disclosed by name or formula (generic or specific) in U.S. Pat. No. 4,217,438. Some particular examples of aromatic dihydroxy compound comonomers include 4,4'-(3,3,5-trimethylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4'- dihydroxydiphenylmethane; bis(2-hydroxyphenyl)methane; bis(4-hydroxyphenyl)methane; bis(4-hydroxy-5-nitrophenyl) methane; bis(4-hydroxy-2,6-dimethyl-3-methoxyphenyl) methane; 1,1-bis(4-hydroxyphenyl)ethane; 1,1-bis(4-hydroxy-2-chlorophenyl)ethane; 2,2-bis(4-hydroxyphenyl) propane (commonly known as bisphenol A); 2,2-bis(3- phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 2,2-bis(3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; and $C_{1-3}$alkyl-substituted resorcinols.

Suitable aromatic dihydroxy comonomer compounds also include those containing indane structural units such as those represented below by formulas (VII) and (VII) as shown below.

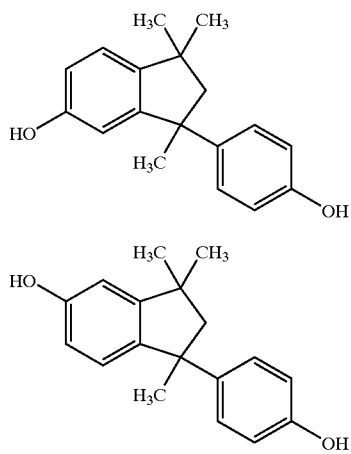

(VII)

(VIII)

Also included among suitable aromatic dihydroxy compound comonomers are the 2,2,2',2'-tetrahydro-1,1'-spirodiols having formula (IX) as follows:

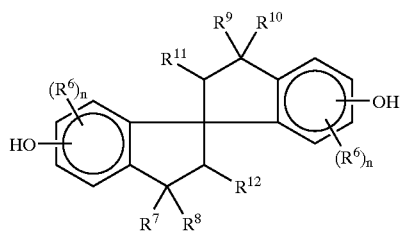

(IX), wherein each $R^6$ is independently selected from monovalent hydrocarbon radicals and halogen radicals; wherein each $R^7$, $R^8$, $R^9$, and $R^{10}$ is independently $C_{1-6}$alkyl; wherein each $R^{11}$ and $R^{12}$ is independently H or $C_{1-6}$alkyl; and wherein each n is independently selected from positive integers having a value of from 0 to 3 inclusive. In a particular embodiment, the 2,2,2',2'-tetrahydro-1,1'-spiro-diol is 2,2,2',2'-tetrahydro-3,3,3',3'-tetramethyl-1,1'-spirobi[1H-indene]-6,6'-diol.

The term "alkyl" as used in the various embodiments of the present disclosure is intended to designate straight chain alkyl, branched alkyl, aralkyl, cycloalkyl, and bicycloalkyl radicals. In various embodiments, straight chain and branched alkyl radicals, unless otherwise specified are those containing from 1 to about 8 carbon atoms, and include as illustrative non-limiting examples methyl, ethyl, n-propyl, isopropyl, n-butyl, sec-butyl, tertiary-butyl, pentyl, neopentyl, hexyl, heptyl, and octyl. In various embodiments, cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments, aralkyl radicals are those containing from 7 to 14 carbon atoms; these include, but are not limited to, benzyl, phenylbutyl, phenylpropyl, and phenylethyl. In various embodiments, the aromatic radicals preferably comprise monocyclic or polycyclic moieties containing from 6 to about 12 ring carbon atoms. These aromatic radicals may also contain one or more halogen atoms or alkyl groups substituted on the ring carbons. Some illustrative non-limiting examples of these aromatic radicals include phenyl, halophenyl, biphenyl, and naphthyl. In another embodiment, the aromatic radicals preferably comprise aralkyl radicals containing from 7 to 14 carbon atoms.

The polycarbonate copolymers preferably comprise carbonate structural unit types of formulas (X) and (XI):

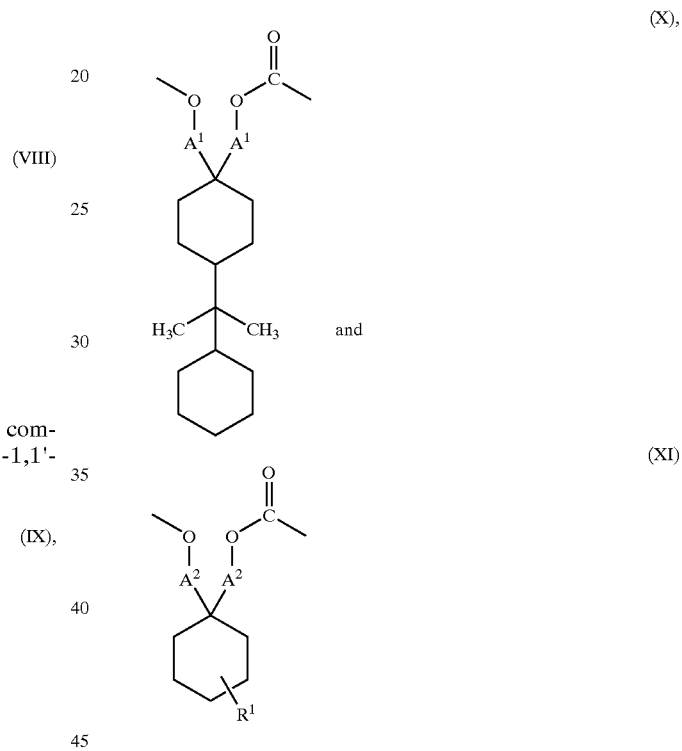

wherein $A^1, A^2$ and $R^1$ are as previously described.

In other embodiments, when the optional aromatic dihydroxy compound comonomer is used, the polycarbonate copolymers will comprise at least one carbonate structural unit selected from the group shown in formula (XII):

(XII), wherein $A^3$ is as previously described.

A method for producing the polycarbonate copolymer by a melt transesterification polymerization method (hereinafter sometimes referred to as "melt method") comprises combining a catalyst and a reactant composition to form a reaction mixture; and mixing the reaction mixture under reactive conditions for a time effective to produce a polycarbonate product. The reactant composition preferably comprises the cyclohexylidene bis(alkylphenol) of formula (I), the alkyl-substituted bisphenol of the formula (III), and the carbonic acid diester of formula (IX), wherein each Z is independently an unsubstituted or substituted alkyl radical, or an unsubstituted or substituted aryl radical. Optionally the reactant composition cfurther comprises at least one aromatic dihydroxy compound of the formula (IV).

In preferred embodiments, suitable aromatic dihydroxy compound comonomers for the preparation of a polycarbonate copolymer are 2,2-bis(4-hydroxyphenyl) propane (commonly known as bisphenol A or "BPA"), resorcinol (sometimes referred to hereinafter as "Res"), 4,4'-(1-decylidene)-bisphenol (sometimes referred to hereinafter as "bispded") and 2,2-bis(3-sec-butyl-4-hydroxyphenyl) propane (sometimes referred to hereinafter as "s-BPA"), or combinations comprising at least one of the foregoing aromatic dihydroxy compounds.

During the manufacture of the polycarbonates by the melt method, the amount of the carbonic acid diesters is preferably about 0.95 to about 1.30 moles based on one mole of the bisphenol and the optional aromatic dihydroxy comonomer, if present, and more preferably, about 1.05 to about 1.15 moles.

Catalysts that can be used for the melt method include all those known to be effective for such polymerization. Suitable catalysts include alkali metal compounds, alkaline earth metal compounds, tetraorganoammonium compounds, tetraorganophosphonium compounds, and combinations comprising at least one of the foregoing catalysts.

Specific examples of alkali metal compounds or alkaline earth metal catalyst compounds include organic acid salts, inorganic acid salts, oxides, hydroxides, hydrides, and alcoholates of alkali metals and alkaline earth metals. In some embodiments, the catalyst comprises an alkali metal compound of the formula $M^1X^1$, wherein $M^1$ is selected from the group consisting of lithium, sodium, and potassium; and $X^1$ is selected from the group consisting of hydroxide and OAr, wherein Ar is a monovalent aromatic radical.

Exemplary alkali metal compounds include, but are not intended to be limited to, sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, and the like.

Exemplary alkaline earth metal compounds include, but are not intended to be limited to, calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, and strontium stearate, and the like.

Suitable tetraorganoammonium catalysts comprise formula (XIII) $R^{13}NY^2$, wherein $R^{13}$ is a $C_1$–$C_4$ alkyl group, and $Y^2$ is hydroxide, acetate, or OAr, wherein Ar is a monovalent aromatic radical. Exemplary tetraorganoammonium catalysts include tetramethylammonium hydroxide, tetrabutylammonium hydroxide, and the like.

Suitable, tetraorganophosphonium catalysts comprise formula (XIV) $(R^{14})_4PY^2$, wherein $R^{14}$ is a $C_1$–$C_4$ alkyl group, and $Y^2$ is as previously described. Exemplary tetraorganophosphonium catalysts include tetraethylphosphonium hydroxide, tetrabutylphosphonium acetate, tetrabutylphosphonium hydroxide, and the like.

Any of the catalysts disclosed above may be used as combinations of 2 or more substances. The catalyst may be added in a variety of forms. The catalyst may be added as a solid, for example as a powder, or it may be dissolved in a solvent, for example, in water or alcohol.

In the present disclosure, the total catalyst composition is preferably about $1 \times 10^{-7}$ moles to about $2 \times 10^{-3}$ moles, and more preferably, about $1 \times 10^{-6}$ to about $4 \times 10^{-4}$ moles, for each mole of the combination of the cyclohexylidene bis (alkylphenol), the alkyl-substituted bisphenol, and the optional aromatic dihydroxy compound comonomer, if present.

The term "melt transesterification polymerization" is generally meant to refer to a polymerization process wherein the reactant composition comprises cyclohexylidene bis (alkylphenol) of formula (I), the alkyl substituted bisphenol of formula (III), , the carbonic acid diesters of formula (IX), a catalyst as previously described, and the optional aromatic dihydroxy compound comonomers of formula (IV), if present. Melt transesterification polymerization can be accomplished in a process involving one or more stages. The first stage preferably comprises melt polycondensation of the above reactant composition in the presence of the catalyst. The reactor employed for carrying out these polymerizations can be made either of glass or a metal. In some embodiments, the reactor walls may be passivated by treatment with a suitable acidic material. If it is desirable to carry out the polymerization in a glass reactor, soaking it in an aqueous acid medium can be employed for passivation. Suitable acids for passivation include aqueous solutions of mineral acids, such as hydrochloric acid, sulfuric acid, nitric acid, and the like, and organic acids, such as acetic acid, methanesulfonic acid, toluenesulfonic acid, and the like.

The reactants may be charged into a reactor either in the solid form or in the molten form. Initial charging of the reactants and subsequent mixing may be conducted in an inert gas atmosphere, e.g., a nitrogen gas atmosphere. Mixing of the reaction mixture is accomplished by methods known in the art, such as by stirring. Reactive conditions in the present context refer to conditions comprising time, temperature, pressure and other factors that result in polymerization of the reactants.

The polymerization may be conducted by subjecting the above reaction mixture to a series of temperature-pressure-time protocols. In some embodiments, this involves gradually raising the reaction temperature in stages while gradually lowering the pressure in stages. For example, the pressure may be varied from about atmospheric pressure at the start of the reaction to between about atmospheric pressure and about 0.01 millibar pressure, with a pressure between about atmospheric pressure and about 0.05 millibar pressure more preferred; and with a pressure between about 300 millibars pressure and about 0.05 millibar pressure even more preferred. The temperature is preferably varied from about the melting temperature of the reaction mixture to about 350° C., with about 180° C. to about 230° C. more preferred, with about 230° C. and about 270° C. even more preferred, and between about 270° C. and about 350° C. most preferred. This procedure will generally ensure that the reactants react properly to produce polycarbonates copolymers with the desired molecular weight, glass transition temperature and physical properties. The reaction proceeds to build the polymer chain with production of phenol by-product. Efficient removal of the phenol by-product by application of vacuum produces polycarbonates of high molecular weight. If phenol is not removed efficiently, it may participate in the backward reaction whereby the polymer chain is cleaved by phenol in the presence of the polymerization catalyst, thus leading to polymer of lower molecular weight with undesirable mechanical and other physical properties. In various embodiments, the progress of the reaction may be monitored by measuring the melt viscosity or the weight average molecular weight of the reaction mixture. After the desired melt viscosity and/or molecular weight is reached, the final polycarbonate product may be isolated from the reactor in a solid or molten form.

The melt transesterification polymerization can be operated either in a batch, semi-batch, or a continuous mode. Reaction apparatus known in the art may be used in conducting this reaction.

The polycarbonates copolymers described herein preferably have a weight average molecular weight of at least about 5,000, a glass transition temperature of at least about 125° C., and a dimensional stability of less than about 0.05% in films comprising the polycarbonate copolymer, as measured by percentage elongation of relative to its initial length following exposure to nitrogen with a relative humidity of about 100 at a temperature of about 23° C. and for a duration of about 3 hours.

The dimensional stability is measured by placing a film of the polycarbonate copolymer in a controlled chamber and exposing the film to a stream of nitrogen maintained at a pre-determined level of humidity and temperature for a specified length of time. The absorption of moisture will cause the film to swell or elongate. The film is then de-swelled by driving the absorbed moisture out using de-humidified heated nitrogen, and the process is generally repeated to arrive at the percent elongation. A relatively low percent elongation (e.g., less than about 0.05%) indicates resistance to moisture absorption, which translates to excellent dimensional stability. Polycarbonate copolymer films in accordance with the present disclosure exhibit outstanding dimensional stability in a humid environment, as evidenced by a percent elongation of less than about 0.05% of the original length of the film. The polycarbonate copolymers described herein unexpectedly exhibit better dimensional stability properties than, BPA homopolycarbonate films, and other comparative materials that are made using resorcinol comonomers, or resorcinol and BPA as comonomers.

The polycarbonate copolymers and the melt method for producing these polycarbonate copolymers can be used for producing articles suitable for high density optical media storage applications. The polycarbonate compositions and the methods described above to prepare them are used to make optical articles and films for display devices. Optical articles that can be prepared using the polycarbonates comprise a film, an optical data storage medium, a rewritable optical disk, and a substrate for an optical data storage medium. The optical articles can function as the protective, transparent layer that covers the various recording media, such as high-density data storage using DVD, and more specifically, HD-DVD, DVR, DVD-R and DVR+R, and DVD-RW and DVD+RW formats.

Another aspect of the present disclosure is a method of making an article comprising molding a composition comprising the polycarbonate copolymers produced by the melt transesterification polymerization methods described above. In various embodiments, the polycarbonate copolymers for the molding composition comprise the cyclohexylidene bis (alkylphenol), the long chain alkyl-substituted bisphenol, and the optional aromatic dihydroxy compound comonomer described herein.

The molding step for making such articles can be performed by injection molding, thermoforming, blow molding, and the like.

The disclosure is further illustrated by the following non-limiting Examples. In the examples to follow, the following procedures were employed.

Glass transition temperature of the polycarbonates was measured by differential scanning calorimetry by heating the sample at the rate of 10° C. to 20° C. per minute under nitrogen. Weight average molecular weight ($M_w$) and number average molecular weight ($M_n$) were measured by gel permeation chromatography. Values quoted are relative to those measured for polystyrene standard. Dimensional stability of the polycarbonate sample was measured by first casting a film from a solution of the polycarbonate in dichloromethane. The film was then placed in a chamber and subjected to a flow of nitrogen gas or nitrogen maintained at a relative humidity of 100% and 23° C. After a pre-determined length of time, generally about 30 to about 45 minutes, the film was exposed to a stream of dry nitrogen gas flowing at the rate of about 150 to about 200 ml/minute to remove all absorbed moisture from the film. The above process was repeated three times and the final length of the film was measured. The percent elongation (increase in length) of the film relative to the initial length was then calculated. The catalyst composition was prepared by taking appropriate aliquots of a stock solution of 0.1 molar aqueous sodium hydroxide and 25-weight percent aqueous tetramethylammonium hydroxide.

EXAMPLE 1

In this Example, polycarbonate copolymers in accordance with the present disclosure were prepared in a melt transesterification polymerization, and compared to a BPA polycarbonates made under similar conditions.

A glass polymerization reactor was first passivated by soaking the reactor in a bath containing 1 molar aqueous hydrochloric acid solution. After about 24 hours, the reactor was first rinsed with demineralized water, and then with deionized water to ensure that all traces of the acid and other contaminants were removed. The reactor was then dried and charged with a reactant composition and then mounted in a polymerization assembly and checked to ensure that no leaks were present. The required amount of the catalyst solution, as prepared above, was introduced into the reactor using a syringe. The atmosphere inside the reactor was evacuated using a vacuum source and purged with nitrogen. This cycle was repeated 3 times after which the contents of the reactor were heated to melt the monomer mixture. When the temperature of the mixture reached about 180° C., the stirrer in the reactor was turned on and adjusted to about 40 to about 80 revolutions per minute (rpm) for about 15 to about 20 minutes. The reaction mixture was then heated to about 230° C. while the pressure inside the reactor was adjusted to about 170 millibar. This temperature-pressure-time regime was designated as P1. After stirring the reaction mass at this condition for about 1 hour, the reaction temperature was raised to about 270° C. while readjusting the pressure to about 20 millibar. After being maintained at this condition, designated as P2, for about 30 minutes, the temperature of the reaction mixture was raised to about 300° C. while bringing the pressure down to about 1.5 millibar. After allowing the reaction to proceed under these conditions, designated as P3, for about 30 to about 60 minutes, the pressure inside the reactor was brought to atmospheric pressure and the reactor was vented to relieve any excess pressure. Product isolation was accomplished by breaking the glass nipple at the bottom of the reactor and collecting the material. In the cases where the product was of a very high molecular weight, the hot molten polymer was dropped down by pressurizing the reactor with nitrogen gas.

The general polymerization procedure described above was used to prepare the polycarbonates. For each polycarbonate prepared, the glass transition temperature, molecular weight, and swell data were measured using the general procedures described above. The results are shown below in Table 1.

All reactions were carried out using a mole ratio of diphenyl carbonate to combination of cyclohexylidene bis (alkylphenol) of formula (II), an alkyl-substituted bisphenol of formula (III), and aromatic dihydroxy compound comonomers (IV) of 1.08:1, respectively. The catalyst used was mixture of sodium hydroxide and tetramethylammonium hydroxide taken in a mole ratio of 1:100, respectively. In each case, $2.5 \times 10^{-4}$ moles of tetramethylammonium hydroxide per mole of the combination of bisphenol and aromatic dihydroxy compound comonomer was employed.

Example 1 included 1,1-bis(3-methyl-4-hydroxyphenyl)-3-pentadecylcyclohexane monomer as the alkyl substituted bisphenol (shown in Table 1 as formula (XV)). Comparative Example 2 included BPA, resorcinol and 1,1-bis(3-methyl-4-hydroxyphenyl)-3-pentadecylcyclohexane monomers. Comparative Example 3 included BPA, 1,1-bis(3-methyl-4-hydroxyphenyl)-3-pentadecylcyclohexane monomers. Comparative Example 4 refers to BPA homopolycarbonate made using BPA and diphenyl carbonate. The "bisphenol mixture" in Table 1 refers to the percentages of the cyclohexylidenebis(alkylphenol) monomer, the alkyl-substituted bisphenol monomer, and the aromatic dihydroxy compound monomer.

TABLE 1

| Example Number | "bisphenol mixture" | | Resorcinol | BPA | $M_w$ (×10³) | $M_n$ (×10³) | $T_g$ (° C.) | % Elongation |
|---|---|---|---|---|---|---|---|---|
| | (II) | (XV) | | | | | | |
| 1 | 94 | 6 | 0 | 0 | 30.6 | 14.3 | 152 | 0.019 |
| 2* | 50 | 0 | 20 | 30 | 32.3 | 15.4 | 152.5 | 0.041 |
| 3* | 15 | 0 | 0 | 85 | 41 | 16 | 146 | 0.033 |
| 4* | 0 | 0 | 0 | 100 | 47.2 | 19.3 | 147 | 0.052 |

*Comparative Example

Table 1 shows that the polycarbonate copolymer of Example 1 resulted in a % elongation that is significantly and unexpectedly lower than the polycarbonates of Comparative Examples 2–4 (without the long chain alkyl substituted bisphenol as one of the monomers). Polycarbonates having relatively low % elongation values of less than about 0.05% are valuable materials for producing articles used in optical applications, such as a high density digital versatile disk and a digital video rewritable format.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A polycarbonate copolymer comprising structural units derived from:

a cyclohexylidene bis(alkylphenol) compound represented by a formula comprising:

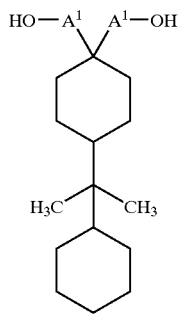

wherein $A^1$ is a trisubstituted aromatic radical having the formula $C_6H_3R^2$, wherein $R^2$ is selected from the group consisting of $C_1$–$C_6$ alkyl radicals, and combinations comprising at least one of the foregoing radicals;

an alkyl-substituted bisphenol represented by a formula comprising:

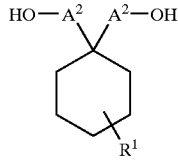

wherein $A^2$ is a substituted or unsubstituted aromatic radical; and $R^1$ is selected from the group consisting of $C_{13}$–$C_{22}$ alkyl radicals; and a carbonic acid diester compound.

2. The polycarbonate copolymer of claim 1, further comprising structural units derived from at least one aromatic dihydroxy compound represented by a formula comprising:

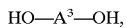

wherein $A^3$ is selected from divalent substituted and unsubstituted aromatic radicals.

3. The polycarbonate copolymer of claim 1, finder comprising structural units derived from at least one aromatic dihydroxy compound represented by a formula comprising:

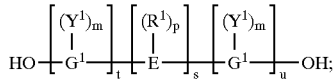

wherein $G^1$ is an aromatic group; wherein E is an alkylene, an alkylidene, a cycloaliphatic group; a sulfur-containing linkage, a phosphorus-containing linkage; an ether linkage, a carbonyl group, a tertiary nitrogen group, or a silicon-containing linkage, wherein $R^1$ is a hydrogen or a monovalent hydrocarbon group; wherein $Y^1$ is selected from the group consisting of a monovalent hydrocarbon group, alkenyl, allyl, halogen, bromine, chlorine; nitro; wherein "m" represents any integer from and including zero through the number of positions on $G^1$ available for substitution; wherein "p" represents an integer from and including zero through the number of positions on E available for substitution; wherein "t" represents an integer equal to at least one;

wherein "s" is either zero or one; and wherein "u" represents any integer including zero.

4. The polycarbonate copolymer of claim 2, wherein the at least one aromatic dihydroxy compound is selected from the group consisting of 4,4'-(3,3,5-trimethylcyclohexyldene) diphenol, 4,4'-bis(3,5-dimethyl)diphenol, 1,1-bis(4-hydroxy-3-methylphenyl)cyclohexane, 4,4-bis(4hydroxyphenyl)heptane, 2,4'-dihydroxydiphenylnethane, bis(2-hydroxyphenyl)methane, bis(4-hydroxyphenyl)methane, bis(4-hydroxy-5-nitrophenyl)methane, bis(4hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl) propane, 2,2-bis(4-hydroxy-3,5-dimethylphenyl)propane, 2,2-bis(3,5,3',5'-tetachloro-4,4'-dihydroxyphenyl)propane, bis(4 hydroxyphenyl)cyclohexylmethane, 2,2-bis(4hydroxyphenyl)-1-phenylpropane, 2,4'-dihydroxyphenyl sulfone, 2,6-dihydroxy naphthalene; hydroquinone; resorcinol, $C_{1-3}$alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, 4,4'-(1-decylidene)bisphenol, 2,2-bis(3-sec-butyl-4-hydroxyphenyl)propane, and combinations comprising at least one of the foregoing aromatic dihydroxy compounds.

5. The polycarbonate copolymer of claim 1, wherein the polycarbonate has a glass transition temperature of at least about 125° C.; a weight average molecular weight of at least about 5,000; and a dimensional stability as measured by percentage elongation of less than about 0.05% relative to its initial length following exposure to air with a relative humidity of about 100%, at a temperature of about 23° C., and for a duration of about 3 hours.

6. The polycarbonate copolymer of claim 1, wherein the alkyl-substituted bisphenol is selected from the group consisting of 1,1-bis(3-methyl4-hydroxyphenyl)-3-pentadecylcyclohexane; 1,1-bis(3-methyl-4-hydroxyphenyl)-3-octadecylcyclohexane, and 1,1-bis(3-methyl-4-hydroxyphenyl)-3-docosylcyclohexane.

7. An injection molded or a blow molded article comprising the polycarbonate of claim 1.

8. The article of claim 7, wherein the article is an optical disk selected from the group consisting of a high-density digital versatile disk and a digital video rewritable format.

9. The polycarbonate copolymer of claim 1, wherein the cyclohexylidene bis(alkylphenol) is represented by the formula:

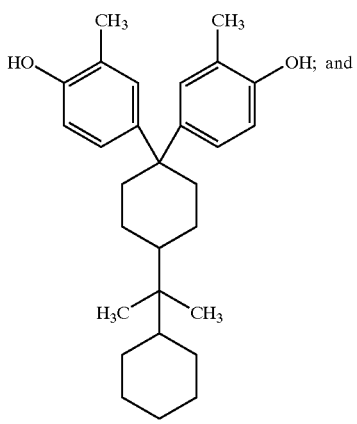

the alkyl-substituted bisphenol is represented by the formula:

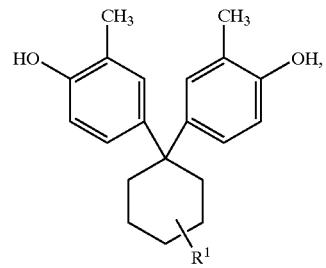

wherein $R^1$ independently comprises a $C_{13}$–$C_{22}$ long chain alkyl radical.

10. A melt transesterification polymerization method for producing a polycarbonate, the method comprising:
   combining a catalyst and a reactant composition to form a reaction mixture; and
   mixing the reaction mixture under reactive conditions for a time period to produce a polycarbonate product, wherein the reactant composition comprises:
      a carbonic acid diester of the formula $(ZO)_2C=O$, where each Z is independently an unsubstituted or substituted alkyl radical, or an unsubstituted or substituted aryl radical;
      a cyclohexylidene bis(alkylphenol) of the formula:

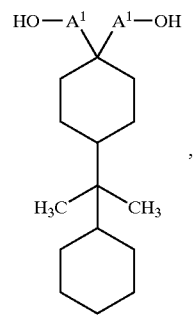

wherein $A^1$ is a trisubstituted aromatic radical having the formula $C_6H_3R^2$, wherein $R^2$ is selected from the group consisting of $C_1$–$C_6$ alkyl radicals, and combinations comprising at least one of the foregoing radicals; and
   an allyl-substituted bisphenol of the formula:

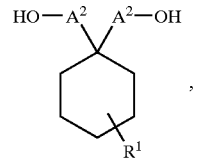

wherein $A^2$ is a substituted or unsubstituted aromatic radical; and $R^1$ is selected from the group consisting of $C_{13}$–$C_{22}$ alkyl radicals.

11. The melt transesterification polymerization method of claim 10, wherein the reaction composition further comprises at least one aromatic dihydroxy compound comonomer of the formula:

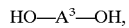

wherein $A^3$ is selected from divalent substituted or unsubstituted aromatic radicals.

12. The melt transesterification polymerization method of claim 11, wherein the aromatic dihydroxy compound is selected from the group consisting of 4,4'-(3,3,5-trimethylcyclohexylidene)diphenol, 4,4'-bis(3,5-dimethyl)diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4hydroxy-3-isopropylphenyl)propane, 2,2-bis(4-hydroxy-3,5-dimethylphenylypropane, 2,2-bis(3,5,3',5'-tetrachloro4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene, hydroquinone, $C_{1-3}$ alkyl-substituted resorcinols, 3-(4hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1lH-indene]-6,6'- diol, resorcinol, 4,4'-(1-decylidene)-bisphenol, 2,2-bis(3-sec-butyl-4-hydroxyphenyl)propane, and combinations comprising at least one of the foregoing aromatic dihydroxy compounds.

13. The melt transesterification polymerization method of claim 10, wherein the catalyst is selected from the group consisting of alkali metal compounds, alkaline earth metal compounds, tetraorganoammonium compounds, and tetraorganophosphonium compounds.

14. The melt transesterification polymerization method of claim 10, wherein the catalyst composition is $1 \times 10^{-7}$ to about $2 \times 10^{-3}$ moles for each mole of the reaction composition.

15. The melt transesterification polymerization method of claim 10, wherein the carbonic acid diester is selected from the group consisting of diaryl carbonates, dialkyl carbonates, mixed aryl-alkyl carbonates, diphenyl carbonate, bis(2,4dichlorophenyl) carbonate, bis(2,4,5-trichlorophenyl) carbonate, bis(2-cyanophenyl) carbonate, bis(o-nitrophenyl) carbonate, (o-carbomethoxyphenyl)carbonate; (o-carboethoxyphenyl)carbonate, ditolyl carbonate, m-cresyl carbonate, dinaphthyl carbonate, di(biphenyl) carbonate, diethyl carbonate, dimethyl carbonate, dibutyl carbonate, dicyclohexyl carbonate, and combinations comprising at least one of the foregoing carbonic acid diesters.

16. The melt transesterification polymerization method of claim 10, wherein the reaction mixture is mixed at a temperature at about the melting temperature of the reaction mixture and about 350° C.

17. The melt transesterification polymerization method of claim 10, wherein reaction mixture is mixed at a temperature that is stepwise raised from a first step of an initial value at about a melting temperature of the reaction mixture to about 180° C.; then to a second step of about 180° C. to about 230° C.; then to a third step of about 230° C. to about 270° C.; and then to a fourth step of about 270° C. to about 300° C.

18. The melt transesterification polymerization method of claim 10, wherein the reaction mixture is mixed at a pressure of about 0.01 mbar to about atmospheric pressure.

19. The melt transesterification polymerization method of claim 10, wherein the carbonic acid diester comprises a mole ratio of about 0.95 to about 1.30 to a total amount of moles of the reactant composition.

20. A melt transesterification polymerization method for producing a polycarbonate, the method comprising:
combining a catalyst comprising at least one of sodium hydroxide or tetramethylammonium hydroxide, and a reactant composition to form a reaction mixture; and mixing the reaction mixture under reactive conditions for a time period to produce a polycarbonate product, wherein the reactant composition comprises:
diphenyl carbonate,
a cyclohexylidene bis(alkylphenol) of the formula:

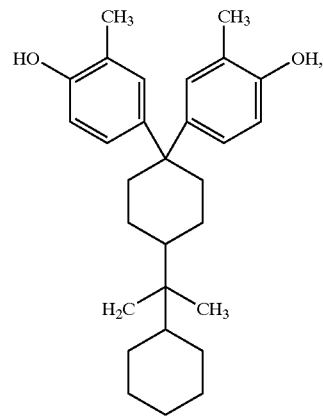

a long chain alkyl-substituted bisphenol of the formula:

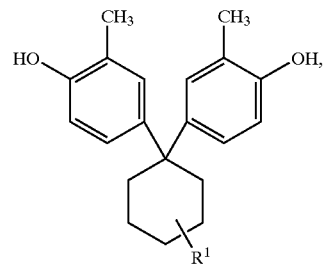

wherein $R^1$ independently comprises a $C_{13}$–$C_{22}$ long chain alkyl radical; and
at least one aromatic dihydroxy compound comonomer selected from the group consisting of resorcinol, bisphenol A, 4,4'-(1-decylidene)bisphenol, 2,2-bis (3-sec-butyl-4-hydroxyphenyl)propane, and mixtures thereof.

21. The method of claim 20, wherein the long chain alkyl-substituted bisphenol is selected from the group consisting of 1,1-bis(3-methyl-4-hydroxyphenyl)-3-pentadecylcyclohexane; 1,1-bis(3-methyl-4-hydroxyphenyl)-3-octadecylcyclohexane, and 1,1-bis(3-methyl-4-hydroxyphenyl)-3-docosylcyclohexane.

22. An injection molded or a blow-molded article comprising the polycarbonate produced by the method of claim 20.

23. An optical disk comprising the polycarbonate produced by the method of claim 20.

* * * * *